Figure 1:
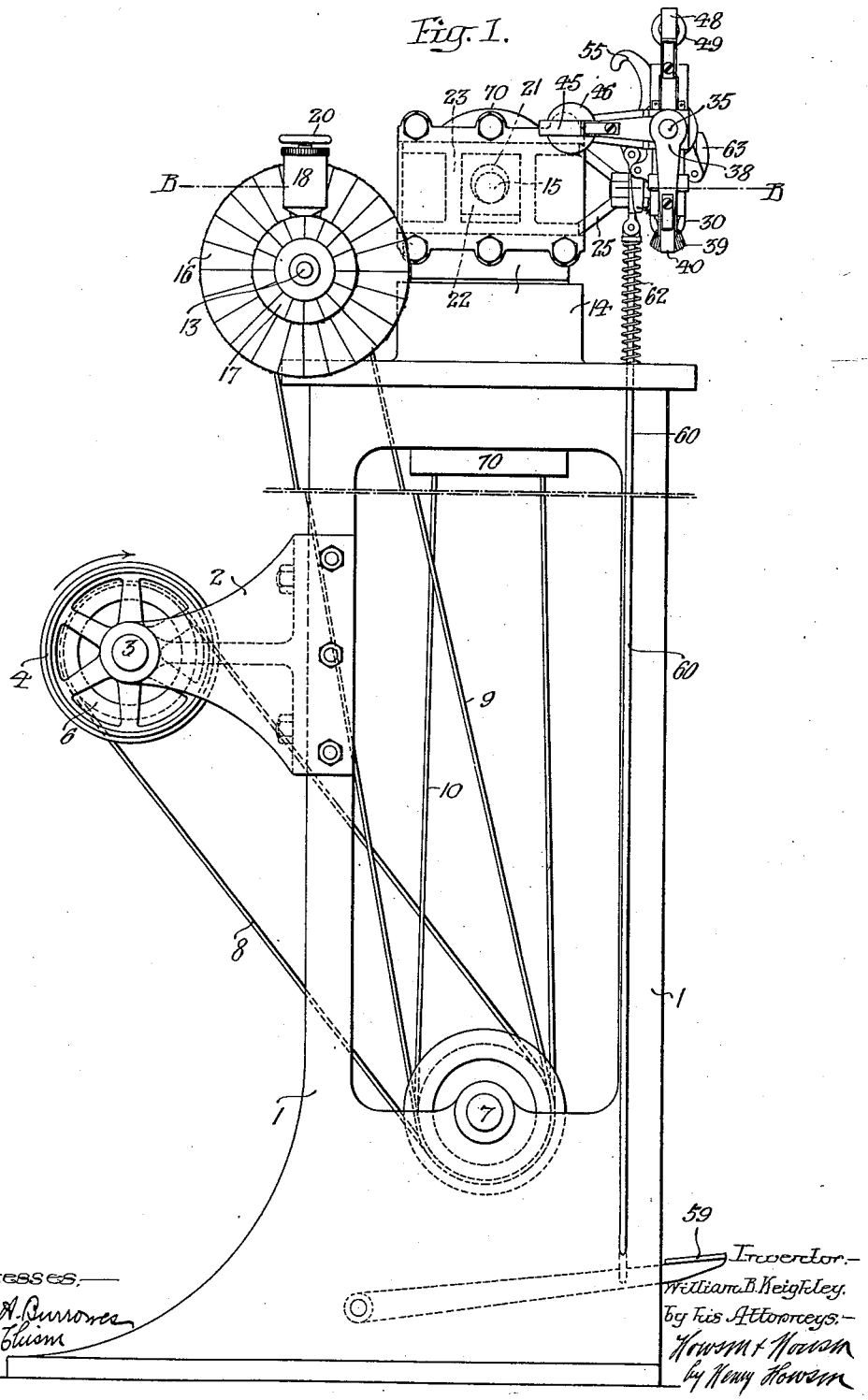

W. B. KEIGHLEY.
IRONING MACHINE.
APPLICATION FILED SEPT. 27, 1910.

1,098,266.

Patented May 26, 1914.
5 SHEETS—SHEET 1.

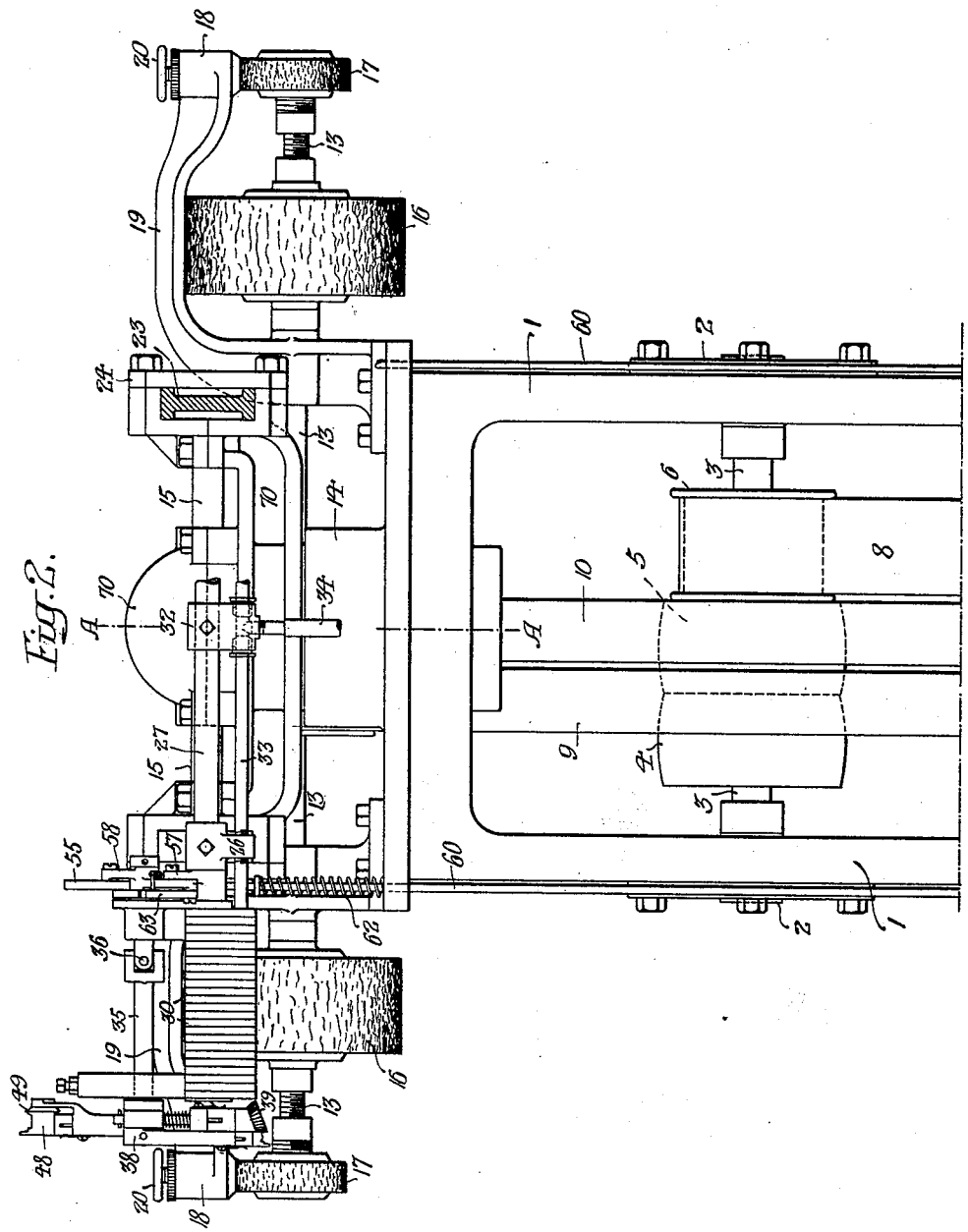

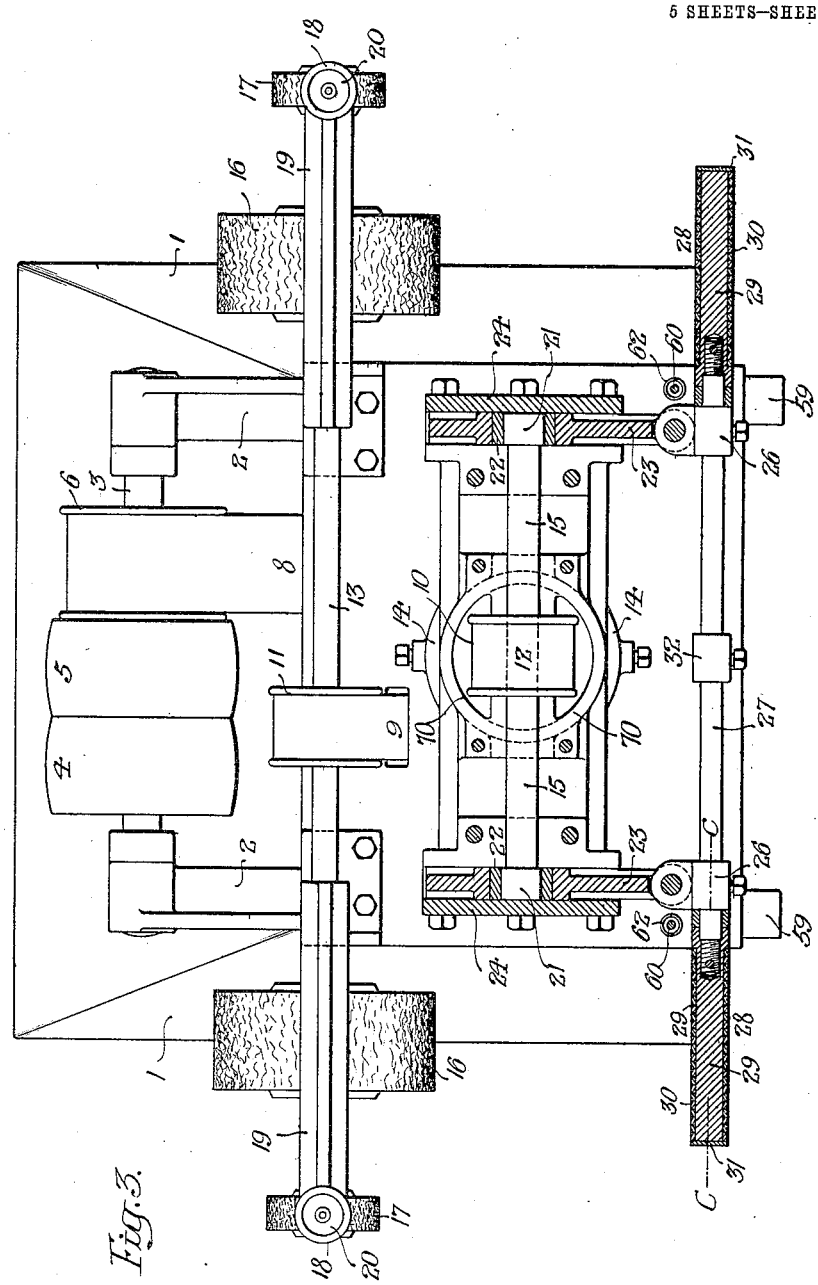

W. B. KEIGHLEY.
IRONING MACHINE.
APPLICATION FILED SEPT. 27, 1910.
1,098,266.
Patented May 26, 1914.
5 SHEETS—SHEET 4.
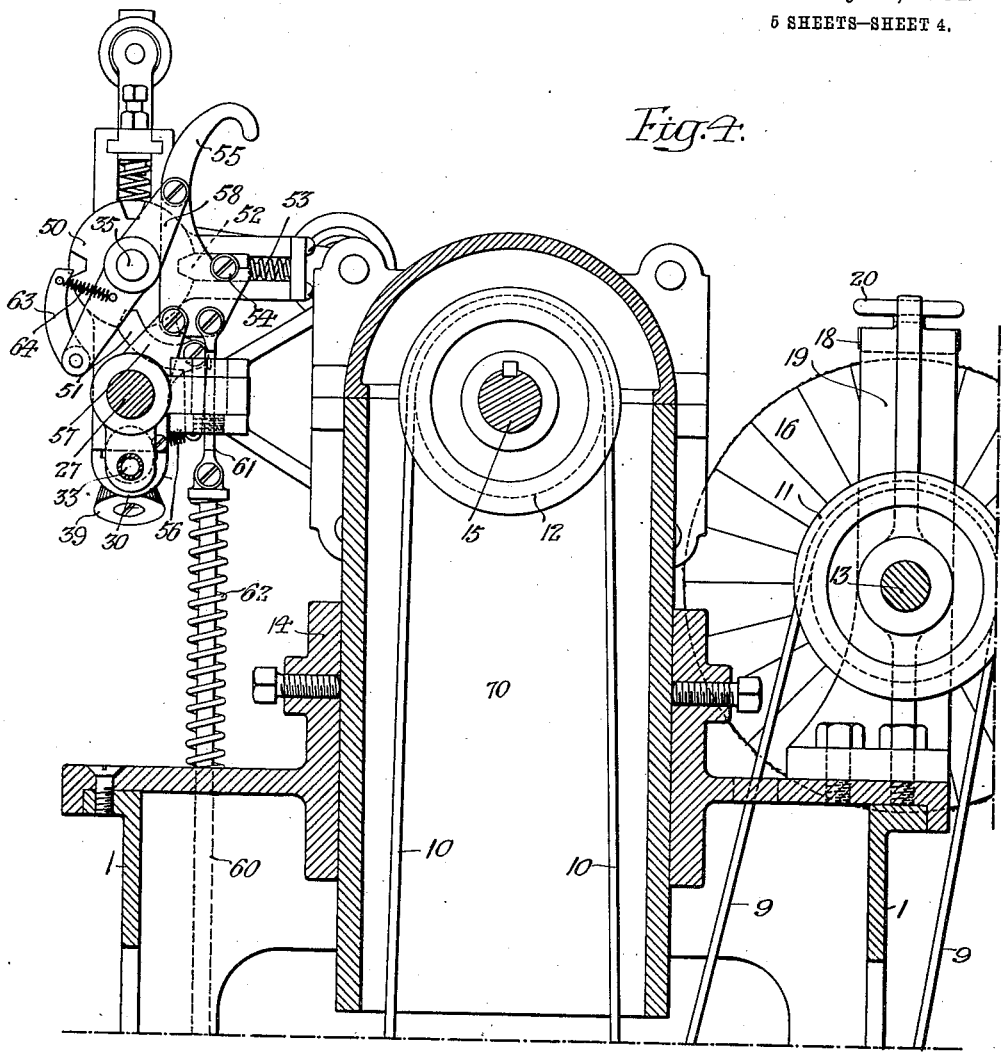
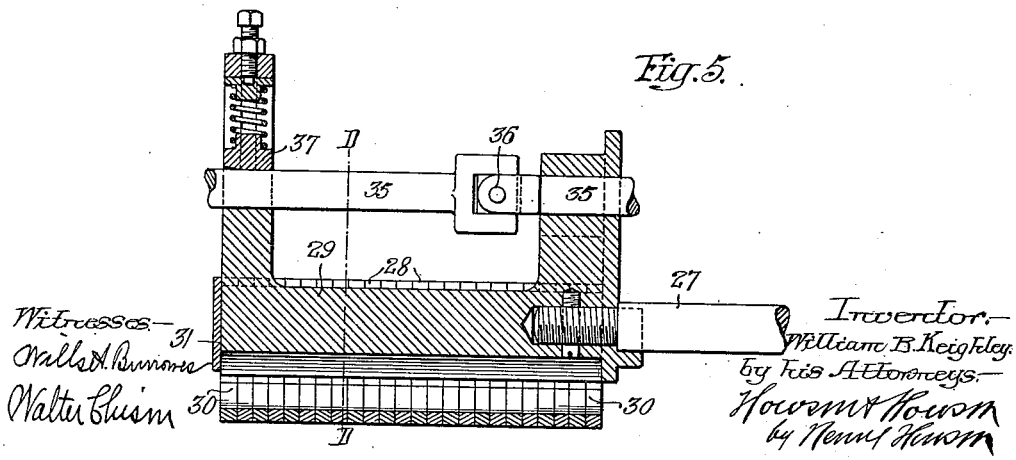

W. B. KEIGHLEY.
IRONING MACHINE.
APPLICATION FILED SEPT. 27, 1910.
1,098,266.
Patented May 26, 1914.
5 SHEETS—SHEET 5.
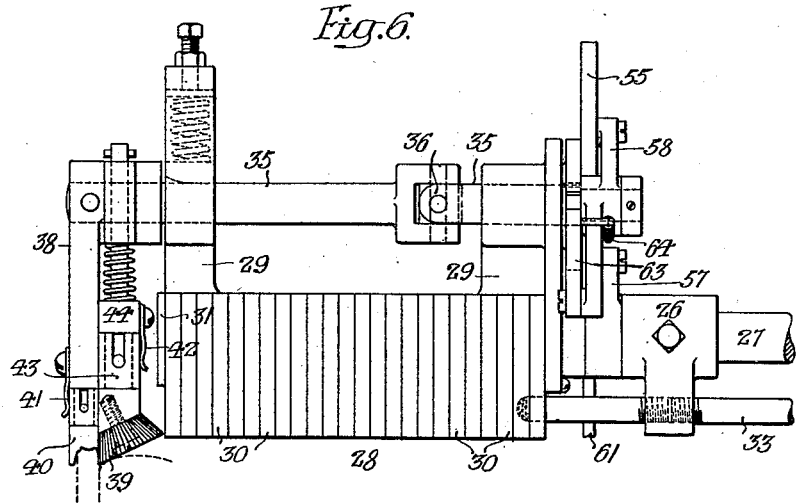
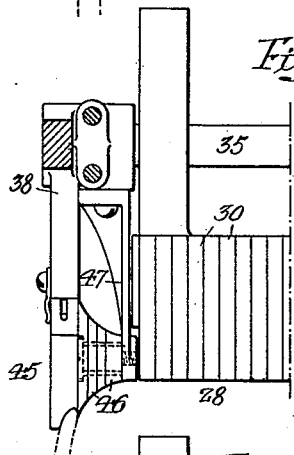
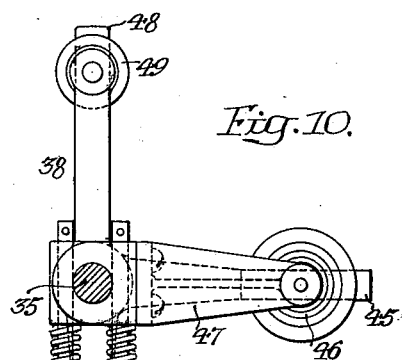
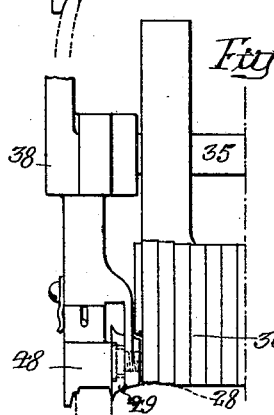
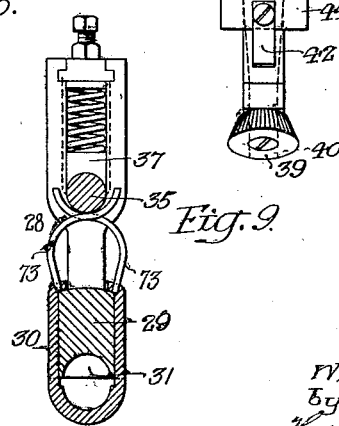
Witnesses
Inventor:—
William B. Keighley.
By his Attorneys,
Howson & Howson
by Henry Howson

UNITED STATES PATENT OFFICE.

WILLIAM B. KEIGHLEY, OF VINELAND, NEW JERSEY, ASSIGNOR TO THE KEIGHLEY COMPANY, OF VINELAND, NEW JERSEY, A CORPORATION OF NEW JERSEY.

IRONING-MACHINE.

1,098,266.            Specification of Letters Patent.        Patented May 26, 1914.

Application filed September 27, 1910. Serial No. 584,078.

*To all whom it may concern:*

Be it known that I, WILLIAM B. KEIGHLEY, a citizen of the United States, and a resident of Vineland, Cumberland county, New Jersey, have invented certain Improvements in Ironing-Machines, of which the following is a specification.

One object of my invention is to provide a machine of improved construction whereby it shall be possible to rapidly "iron" the various parts of a shoe requiring this particular operation; the construction of the device being such that the ironing may be performed in a workmanlike and thoroughly satisfactory manner.

Another object of the invention is to provide an ironing machine having the above characteristics and capable of operating on any or all of the parts of a shoe; the invention contemplating such a construction of iron as will permit of its automatic adjustment to cause it to conform to and properly engage the various parts operated on.

Another object of the invention is to provide a machine which, while having means for ironing a shoe as above indicated, shall, in addition, possess one or a number of attachments whereby simultaneously with the ironing the various parts of the sole edge may be burnished and "set" and the welt indented.

I further desire to provide a machine which shall combine a crease finishing and ironing device, capable of operation either with or without a sole edge burnisher.

Another object of the invention is to provide a shoe ironing machine with a number of attachments, any one of which may be moved to a position to operate on a shoe simultaneously with the iron; the invention also contemplating novel means for rapidly adjusting these attachments.

I further desire to provide an ironing machine which shall include means for conveniently applying wax or grease to a shoe prior to its engagement by the iron, as well as means for cleaning the shoe after it has been ironed.

I also desire to provide a novel form of automatically adjustable iron for use in a machine having the above characteristics.

These objects and other advantageous ends I secure as hereinafter set forth, reference being had to the accompanying drawings, in which;—

Figure 1, is a side elevation of a machine constructed according to my invention; Fig. 2, is a front elevation, partly in section, of the machine shown in Fig. 1; Fig. 3, is a horizontal section on the line B—B, Fig. 1; Fig. 4, is an enlarged vertical section on the line A—A, Fig. 2; Fig. 5, is a vertical section on the line C—C, Fig. 3; Fig. 6, is a side elevation of one of the irons and its associated mechanism forming part of my invention; Figs. 7 and 8 are fragmentary side elevations similar to Fig. 6, showing the various attachments, used with the iron, in their operative positions; Fig. 9, is a vertical section on the line D—D Fig. 5, although it illustrates, in addition, springs for holding the elements of the iron in the lower position, and Fig. 10, is a side elevation of the structure carrying the indenting and burnishing wheels.

In the above drawings, 1 represents a frame preferably in the form of an open casting having rearwardly projecting brackets 2 adjacent its upper portion; these being provided with bearings for a shaft 3 carrying fast and loose pulleys 4 and 5 with a driving pulley 6. The lower part of the frame has bearings for a shaft 7 on which are fixed three pulleys, one connected through a belt 8 with a pulley 6, and the others connected through belts 9 and 10 with pulleys 11 and 12 respectively. Of these latter pulleys, the first is fixed to a shaft 13 mounted in bearings on the top portion 14 of the frame, while the other is fixed to a shaft 15, likewise supported in bearings on a structure 70 mounted on the forward part of the top of the frame and capable of vertical adjustment to vary the height of the apparatus carried by it.

Inasmuch as the machine illustrated is designed to employ two workmen, it is provided with two complete equipments of grease or wax applying, ironing, and polishing apparatus, and although in describing the various parts reference is made to but a single one of these equipments, it is immaterial whether the machine as actually made is provided with a single or a duplicate outfit.

The shaft 13 has on each end a polishing or cleaning wheel 16 constructed and mounted in any desired manner, and in addition is provided with a grease or wax applying wheel 17 supplied with wax or grease from a cup or retainer 18. This latter is mounted on a bracket 19 projecting from the side of the frame 1 and is provided with an adjustable plunger controlled by a hand wheel 20 whereby material may be forced from it directly onto the wheel 17. As shown in Figs. 1 and 3, each end of the shaft 15 has fixed to it an eccentric 21 on which is mounted a rectangular block 22, free to move up and down in a longitudinally movable slide 23 mounted in suitable guideways 24 carried on the upper part 14 of the frame; the arrangement being such that the revolution of the shaft 15 with its eccentric causes a reciprocation of the slide 23 toward and from the front of the machine.

The arrangement of parts is such that the two eccentrics 21 are equidistant from the pulley 12 and are set on the shaft 15 opposite to each other. Each of the slides 23 has connected to its front end an extension 25 to which is pivoted a bracket 26, and the two brackets are in line with each other so as to support a bar 27 extending transversely across the front of the machine. On each end of this bar is mounted an "iron" 28 consisting of a casting 29 on which are mounted a series of parallel, substantially U-shaped ironing elements 30, preferably of the form and construction shown in Figs. 5 and 9. Each of these elements is highly polished on its exterior edges and has inward extensions resting upon and supported by suitably formed shoulders on the casting 29. This latter extends longitudinally through the various elements and these are so designed as to have a limited vertical movement on said casting; being retained thereon by an end plate 31.

By means of a bracket 32 mounted on the bar 27, I support a fuel supply pipe 33 connected to a flexible conduit 34; the ends of this pipe extending respectively into the two irons 28 where they are provided with suitable burners for heating the same. The upper part of each iron casting 29 has bearings for the support of a spindle 35, which, as shown in Figs. 5 and 6, is made in two parts connected by a universal joint 36; one of these parts being vertically movable to a limited extent in its bearing, around the joint 36 as a center. This portion of the shaft, however, is normally held toward the iron by a spring actuated plunger 37, and carries on its projecting end a structure 38 having three arms which in the present instance are at right angles to each other, as illustrated in Fig. 10. On one of these arms is mounted an indenting wheel 39 and a sole edge burnishing tool 40; this latter being removably held to its arm by a spring catch 41 and the indenting wheel being similarly held by a spring catch 42. Said wheel, however, is revolubly carried by a block 43 held by the catch 42 to a slide 44, movable on its supporting arm relatively to the tool 40, toward and from the shaft 35, so that a shoe brought into engagement with the indenting wheel may be caused to move said wheel bodily toward the shaft to bring the edge of the shoe sole into operative engagement with the edge burnishing tool 40. Moreover, the structure 38 is so mounted on its shaft 35 as to bring the indenting wheel immediately adjacent the end of the iron 28 so that the shoe engaged by said iron may be held in such positions that the wheel 39 will act to indent its welt, while the tool 40 acts on the edge of its sole. As shown in Fig. 7, another one of the arms on the structure 38 is provided with a tool 45 removably held to it and so constructed as to be capable of burnishing the relatively thin edge of the sole immediately in front of the heel. Between this tool and the end of the iron, I mount a plurality of rings 46 of such diameters and shapes of edge that they are capable of conforming to the crease and convex portion of a shoe immediately adjacent the sole and just in front of the heel. These rings are carried by a bracket 47 fixed to the hub of the structure 38 and are all mounted on a screw attached to said bracket so as to be free to move independently of each other toward and from said screw for a limited distance in order to conform to the surface of the shoe engaged. These various rings as well as the end of the bracket 47, are so proportioned and arranged as to be capable of bridging the space between the end of the iron 28 and the burnishing tool 45. The third arm of the structure 38 likewise carries a tool 48 for burnishing the edge of the heel of a shoe and has mounted between said tool and the adjacent edge of the iron 28 an edge setting wheel 49 designed to act upon that portion of the shoe immediately adjacent the heel.

For turning and holding any one of the arms of the structure 38 in position to coöperate with the iron, I provide the mechanism shown in Figs. 1 and 4. This consists of a ratchet wheel 50 fixed to the shaft 35 preferably on or adjacent that end thereof distant from the structure 38. As shown in Fig. 4, this ratchet wheel is provided with four peripheral notches with which coöperate a pivoted pawl 51 and a slidable pawl 52, both suitably mounted on the iron supporting structure. The latter of these is normally pressed toward the ratchet wheel 50 by a spring 53 and has a projection in the form of a roller 54 placed to be engaged by a cam 55. The free end of the pawl 51 is normally held toward the ratchet wheel by a spring 56.

The cam 55 is carried by and pivotally connected to a pair of arms 57 and 58, of which the first is loosely mounted upon the bar 27, while the second is likewise loosely mounted on the shaft 35, the proportioning and arrangement of the parts being such that the cam 55 is moved parallel to itself by the swinging of these arms on their supporting members. Said cam is provided with a curved surface, which, as shown in Fig. 4, is designed to force outwardly the roller 54 with the pawl 52 when said cam is moved downwardly, as by the operation of a treadle 59 connected to it through a rod 60 and a link 61. For returning the cam to its elevated position, and maintaining the treadle raised, I provide a spring 62 acting upon the rod 60 as shown in Fig. 1. The arm 58 projects not only toward the cam 55, but also in the opposite direction and has pivoted to it a third pawl 63 normally held toward the ratchet wheel 50 by a spring 64.

Under operating conditions power is applied to the pulley 4 and through the belt 8, shaft 7 and belts 9 and 10, the two shafts 13 and 15 are turned at a suitable speed. The waxing wheels 17 as well as the polishing or cleaning wheels 16 are thus turned, and in addition the two slides 23 are rapidly reciprocated through the blocks 22 and the eccentrics 21. As a consequence, the opposite ends of the bar are rapidly reciprocated and with them the irons and other devices carried by the iron supporting structure. The shoe to be finished is first provided with a coating of wax, grease or other desired material by being applied to the wheel 17, which is supplied with said material from its cup 18. The iron is kept heated by burning fuel supplied to its interior through the pipes 34 and 33, though it is obvious that other means may be employed. The forepart of the shoe is then applied to one of the irons, which is thus heated, and if it be assumed that the structure 38 is in such position that the indenting wheel 39 and burnishing tool 40 are immediately adjacent the end of the iron 28, it will be seen that the rapid oscillation of the bar 27 imparts to the elements 30 of the iron a rapid reciprocating movement in parallel vertical planes; similarly moving the indenting wheel 29 and the burnishing tool 40.

If the forepart of the shoe be pressed up against the iron so as to bring the edge of the sole into engagement with the tool 40, and if it be likewise moved toward the iron so as to bring the surface of the welt into engagement with the indenting wheel 39, said indenting wheel will be moved upwardly relatively to the burnishing tool 40 and both of these members will likewise be moved upwardly relatively to the iron until certain of the adjacent elements 30 of said iron come into engagement with the surface of the toe or other part of the front of the shoe and move relatively to each other so as to conform to its surface. The rapid reciprocation of the iron, indenting wheel, and tool 40 thus causes the first of these parts to iron or smooth the part to which it is applied while the indenting wheel 39 is moved back and forth over the welt and indents it or smooths indentations previously made, in the desired manner. Simultaneously the tool 40 burnishes or polishes the edge of the sole, the three operations noted being thus carried out in the time hitherto necessary to perform one of them.

After the fore part of the shoe has been operated on, the treadle 59 is depressed, thereby pulling downwardly the cam 55. It will be understood that previously the structure 38 with the shaft 35 has been held from turning by reason of the engagement of the ratchet wheel 50 by the pawl 52, so that the first action of the cam 55 is made to unlock said ratchet wheel by causing this pawl to be pulled away from the wheel through the roller 54. Said action occurs during the first part of the downward movement of the cam 55, after which the pawl 63 engages one of the notches in the ratchet wheel 50 and, as the cam continues to move down, turns said ratchet wheel through an angle of 90°, thereby also turning the shaft 35 and the structure 38 with its attached parts. Owing to its mounting and construction, the pawl 51 presents no opposition to this rotation of the ratchet wheel, but after this has made a 90° movement, drops into another of the notches thereof under the action of its spring 56. Thereafter the release of the treadle 59 permits the cam 55 to return to its original elevated position under the action of the spring 62, thereby drawing the pawl 63 idly over the ratchet wheel and finally permitting the pawl 52 to move into engagement with another one of the notches of said wheel and under the action of its spring 53 again lock it in position. By this turning of the structure 38 the rings 46 and tool 45 are brought adjacent the end of the iron 28 and thereafter the shoe may be again presented to said iron, whereupon the central portions of the sole are burnished and the adjacent portions of the upper are finished or ironed in the desired manner; the various rings 46, as well as the elements of the iron, being as noted, free to move to a slight extent relatively to the edge burnishing tool 45 so as to accommodate themselves to and evenly bear upon the contour of the surface of the upper. Another depression of the treadle 59 causes a second 90° movement of the structure, thereby bringing the tools 48 and 49 adjacent the end of the iron 28, so that a third presentation of the shoe to said iron causes the heel portion of the upper to be smoothed or ironed, and the edge of the sole to be properly shaped or set, as well as burnished or polished. By again turning the structure 38 through 90°, one of its arms may be caused to project vertically upward while the other two extend horizontally in opposite directions, under which conditions any desired portion of the upper of a shoe may be presented to the iron and quickly and thoroughly operated on thereby in the desired and required manner. Thereafter, by properly presenting the finished shoe to the wheel 16, the wax and other foreign material may be quickly removed and the necessary polish given. Another depression of the treadle 59 will again bring the indenting wheel 39 and the tool 40 adjacent the end of the iron, so that the machine is in condition for operation on another shoe.

From the above description it will be seen that by my machine it is possible to simultaneously perform a number of operations which hitherto have been necessarily carried out separately, while in addition by means of my improved iron, the surface of the shoe may be given the necessary finish and smoothing more rapidly and satisfactorily than hitherto. If the machine be built as shown, so as to have duplicate sets of apparatus on its two shafts 13 and 15, the floor space required for a given capacity is greatly diminished and the efficiency of the apparatus is materially increased.

Under certain conditions the elements 30 of the iron may be yieldingly held in their lower positions by means of springs 73 as shown in Fig. 9; these acting with gravity or against the same, depending on the position of the iron, but capable of yielding sufficiently to permit the various elements 30 to conform to the shape of the shoe acted on. Said springs, which may be omitted if desired, are preferably formed of short wires fixed to the elements 30 and curved as shown so as to engage the spindle immediately above them.

It is obvious that many different forms of tool may be used in place of those illustrated at 40, 45 and 48, as for example one of these tools and its coöperating parts may be constructed to finish the heel seat and crease of a regular heel shoe.

I claim:

1. The combination in an ironing machine of a supporting structure; an iron mounted thereon and made in a number of relatively movable parts; a shoe finishing tool mounted adjacent said iron and adjustable in a line substantially parallel to the line of movement of the parts of the iron; with means for actuating said iron and said tool.

2. The combination in an ironing machine of a supporting structure; a guideway thereon; a slide operative in the guideway; an iron consisting of a bar pivoted to the slide; a series of substantially parallel U-shaped elements loosely mounted on the bar; and means for reciprocating the slide.

3. The combination in an ironing machine of a supporting structure; an iron mounted thereon and made in a plurality of independently movable parallel sections free to adjust themselves to the contour of a shoe; means for vibrating said iron; with means for heating said sections.

4. The combination in an ironing machine of a supporting structure; an iron mounted thereon; a plurality of tools mounted adjacent one end of the iron in position to act upon a shoe while it is being operated on by the iron and yieldingly supported so as to be bodily movable relatively thereto; with means for vibrating the iron.

5. The combination in an ironing machine of a supporting structure; an iron mounted thereon; a plurality of tools mounted adjacent one end of the iron in position to act upon a shoe while it is being operated on by the iron; with means for vibrating the iron; said tools being bodily movable relatively to the iron.

6. The combination in an ironing machine of a supporting structure; an iron mounted thereon; a plurality of tools mounted adjacent one end of the iron in position to act upon a shoe while it is being operated on by the iron; with means for actuating the iron, said tools being bodily movable relatively to the iron and one of said tools being free to move bodily relatively to the other.

7. The combination in an ironing machine of a supporting structure; an iron mounted thereon; means for actuating said iron; an indenting wheel mounted adjacent one end of the iron; and a sole edge finishing tool mounted adjacent the indenting wheel in position to co-act therewith and with the iron to simultaneously act on a shoe.

8. The combination in an ironing machine of a supporting structure; an iron mounted thereon; means for actuating said iron; an indenting wheel mounted adjacent one end of the iron; and a sole edge finishing tool mounted adjacent the indenting wheel; said tools being bodily movable relatively to the iron to permit of a shoe being simultaneously engaged by them and by said iron.

9. The combination in an ironing machine of a supporting structure; an iron mounted thereon having actuating means and composed of a number of independently movable sections; with a sole edge finishing tool and an indenting wheel mounted adjacent one end of the iron and both bodily movable relatively to said iron to permit a shoe to be simultaneously engaged by them and by the iron.

10. The combination in an ironing machine of a supporting frame; an iron mounted thereon having actuating means; an adjustable supporting structure mounted adjacent the iron; with a plurality of tools carried by said structure, each capable of bodily movement into position to coöperate with the iron so as to engage a shoe simultaneously therewith.

11. The combination in an ironing machine of a supporting frame; an iron mounted thereon having actuating means; an adjustable supporting structure mounted adjacent the iron; a plurality of tools carried by said structure, each capable of movement into position to coöperate with the iron so as to engage a shoe simultaneously therewith; with means for shifting the position of said structure to change the tool adjacent the iron.

12. The combination in an ironing machine of a supporting frame; an iron mounted thereon having actuating means; a supporting structure mounted on the frame; a plurality of tools carried by said structure; means for moving the structure at will to bring any of its tools into position to engage a shoe simultaneously with the iron; with means for locking the said structure in a given position.

13. The combination in an ironing machine of a frame; a bar having irons at its opposite ends each made in a plurality of independently movable sections; with means for oscillating said bar to simultaneously move the irons in opposite directions.

14. The combination in an ironing machine of a bar; an iron mounted thereon; a revoluble structure carrying a plurality of shoe finishing tools and also mounted on said bar; said structure being placed to permit of any of said tools being moved into an operative position adjacent one end of the iron; with means for reciprocating the bar.

15. The combination in an ironing machine of a supporting structure; an iron mounted thereon; means for vibrating said iron; a wheel for applying material to a shoe; and a cleaning wheel adjacent said iron.

16. The combination in an ironing machine of a supporting structure; a shaft thereon having two eccentrics; members movable in opposite directions by said eccentrics; a bar connected to said members; and an iron carried by said bar.

17. The combination in an ironing machine of a supporting structure; a shaft thereon having two eccentrics; members movable in opposite directions by said eccentrics; a bar connected to said members; and an iron carried at each end of said bar.

In testimony whereof, I have signed my name to this specification, in the presence of two subscribing witnesses.

WILLIAM B. KEIGHLEY.

Witnesses:
 EARLE W. CUNNINGHAM,
 A. G. MAVETH.

Copies of this patent may be obtained for five cents each, by addressing the "Commissioner of Patents, Washington, D. C."